(12) United States Patent
Vanhelle et al.

(10) Patent No.: US 10,528,137 B2
(45) Date of Patent: Jan. 7, 2020

(54) CONTROL INTERFACE WITH HAPTIC FEEDBACK USING A MAGNETORHEOLOGICAL FLUID MODULE

(71) Applicant: DAV, Créteil (FR)

(72) Inventors: Stéphane Vanhelle, Créteil (FR); Jean-Marc Tissot, Créteil (FR)

(73) Assignee: DAV, Créteil (FR)

( * ) Notice: Subject to any disclaimer, the term of this patent is extended or adjusted under 35 U.S.C. 154(b) by 0 days.

(21) Appl. No.: 14/917,282

(22) PCT Filed: Sep. 8, 2014

(86) PCT No.: PCT/FR2014/000202
§ 371 (c)(1),
(2) Date: Mar. 8, 2016

(87) PCT Pub. No.: WO2015/033035
PCT Pub. Date: Mar. 12, 2015

(65) Prior Publication Data
US 2016/0216762 A1 Jul. 28, 2016

(30) Foreign Application Priority Data
Sep. 9, 2013 (FR) ...................... 13 02086

(51) Int. Cl.
*G06F 3/01* (2006.01)
*G06F 3/0362* (2013.01)
(Continued)

(52) U.S. Cl.
CPC .............. *G06F 3/016* (2013.01); *G06F 3/038* (2013.01); *G06F 3/0362* (2013.01); *G06F 3/044* (2013.01); *G06F 3/045* (2013.01)

(58) Field of Classification Search
CPC ........ G06F 3/016; G06F 3/017; G06F 3/0202; G06F 3/03547; G06F 3/0362; G06F 3/041; G06F 3/044; G06F 3/045
(Continued)

(56) References Cited

U.S. PATENT DOCUMENTS 5,359,307 A * 10/1994 Mahoney ........... H01H 51/2209
335/128
5,450,075 A * 9/1995 Waddington ............. G05G 1/10
340/870.28
(Continued)

FOREIGN PATENT DOCUMENTS

DE 102004041690 A1 3/2005
FR 2930654 A1 10/2009
(Continued)

OTHER PUBLICATIONS

International Search Report issued in corresponding application No. PCT/FR2014/000202 dated Mar. 12, 2014 (8 pages).
(Continued)

*Primary Examiner* — Amit Chatly
*Assistant Examiner* — Nelson Lam
(74) *Attorney, Agent, or Firm* — Osha Liang LLP

(57) ABSTRACT

A control interface with haptic feedback for a motor vehicle to take into account an action of a user by providing the user with a haptic feedback. The control unit includes a magnetorheological fluid module that has a rotary element which rotates about an axis of the magnetorheological fluid module, said rotary element being in contact with magnetorheological fluid and designed to be coupled to a grip element, and an application unit for applying a magnetic field to the magnetorheological fluid, designed to modify the strength of
(Continued)

Figure 1:
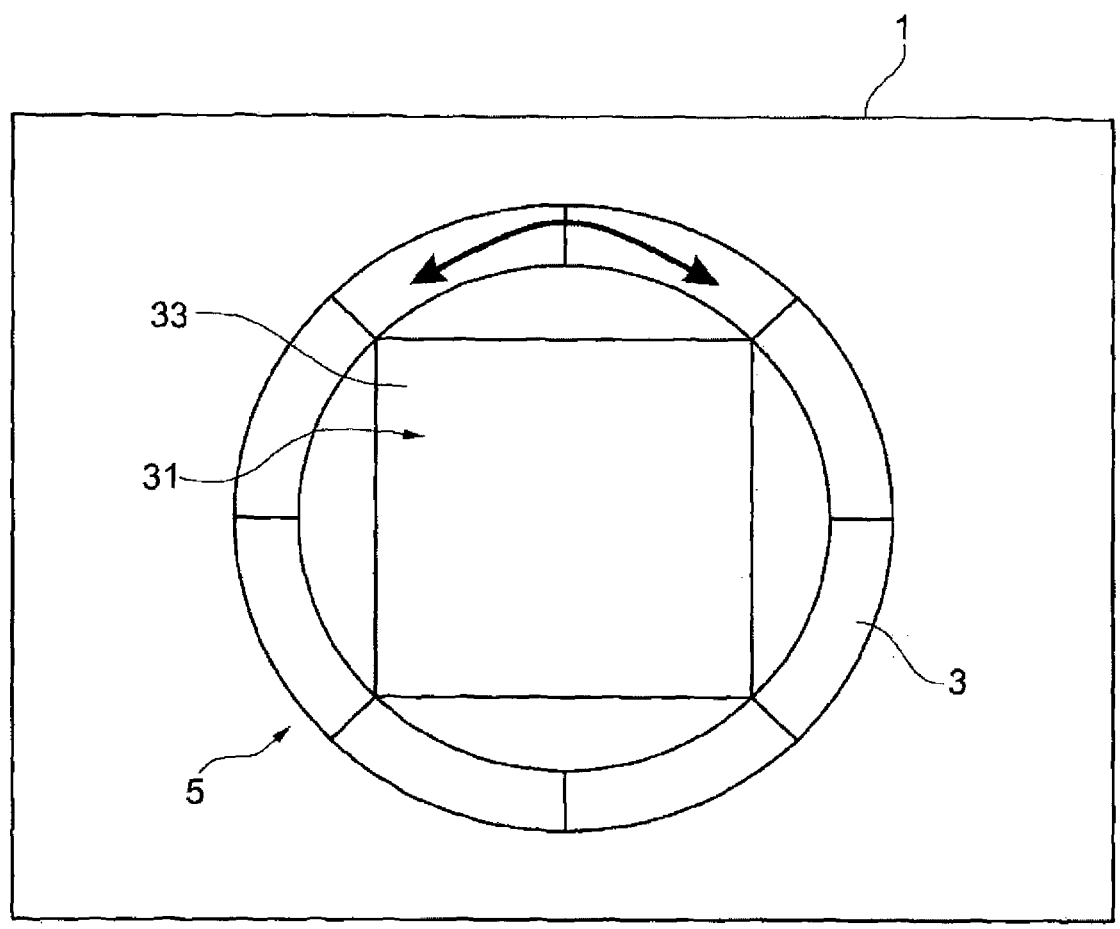

the magnetic field. The control interface also includes a control unit having a fixed tactile surface arranged at the centre of the grip element.

17 Claims, 2 Drawing Sheets

(51) Int. Cl.
*G06F 3/038* (2013.01)
*G06F 3/044* (2006.01)
*G06F 3/045* (2006.01)

(58) Field of Classification Search
USPC .......................................... 345/173–179, 184
See application file for complete search history.

(56) References Cited

U.S. PATENT DOCUMENTS

| | | | | |
|---|---|---|---|---|
| 6,373,465 | B2* | 4/2002 | Jolly | B62D 5/006 |
| | | | | 244/223 |
| 8,797,153 | B2* | 8/2014 | Vanhelle | B60K 37/06 |
| | | | | 340/407.2 |
| 9,164,530 | B2* | 10/2015 | Kandler | B60K 37/06 |
| 9,690,412 | B2* | 6/2017 | Tissot | B60K 37/06 |
| 9,898,032 | B2* | 2/2018 | Hafez | G06F 3/0362 |
| 10,310,603 | B2* | 6/2019 | Vanhelle | B60K 37/06 |
| 10,310,604 | B2* | 6/2019 | Vanhelle | G06F 3/01 |
| 2001/0052893 | A1* | 12/2001 | Jolly | B62D 5/006 |
| | | | | 345/156 |
| 2002/0057152 | A1* | 5/2002 | Elferich | G05G 1/08 |
| | | | | 335/220 |
| 2004/0040800 | A1* | 3/2004 | Anastas | G06F 3/016 |
| | | | | 188/161 |
| 2005/0124387 | A1 | 6/2005 | Ribeiro et al. | |
| 2005/0156892 | A1* | 7/2005 | Grant | G06F 3/016 |
| | | | | 345/167 |
| 2006/0033703 | A1* | 2/2006 | Olien | G06F 3/016 |
| | | | | 345/156 |
| 2006/0071917 | A1* | 4/2006 | Gomez | G06F 3/016 |
| | | | | 345/184 |
| 2006/0274033 | A1* | 12/2006 | Ruettiger | H01H 19/11 |
| | | | | 345/156 |
| 2007/0273671 | A1* | 11/2007 | Zadesky | G06F 3/0338 |
| | | | | 345/173 |
| 2007/0279401 | A1* | 12/2007 | Ramstein | G06F 3/016 |
| | | | | 345/184 |
| 2008/0116896 | A1* | 5/2008 | Skinner | B60T 17/22 |
| | | | | 324/418 |
| 2010/0283588 | A1* | 11/2010 | Gomez | G06F 3/016 |
| | | | | 340/407.2 |
| 2010/0315349 | A1* | 12/2010 | Choi | G06F 3/0338 |
| | | | | 345/173 |
| 2012/0249315 | A1* | 10/2012 | Vanhelle | B60K 37/06 |
| | | | | 340/425.5 |
| 2013/0175132 | A1* | 7/2013 | Battlogg | F16D 37/02 |
| | | | | 192/21.5 |
| 2016/0018891 | A1* | 1/2016 | Levesque | G06F 3/016 |
| | | | | 345/174 |
| 2016/0209863 | A1* | 7/2016 | Stringos | G05G 1/10 |
| 2016/0216763 | A1* | 7/2016 | Vanhelle | B60K 37/06 |
| 2016/0224114 | A1* | 8/2016 | Vanhelle | B60K 37/06 |
| 2016/0378131 | A1* | 12/2016 | Battlogg | G05G 5/03 |
| | | | | 74/553 |
| 2017/0227980 | A1* | 8/2017 | Hafez | G06F 3/0362 |
| 2018/0229704 | A1* | 8/2018 | Eck | G06F 3/016 |
| 2018/0231093 | A1* | 8/2018 | Hafez | F16F 9/535 |
| 2019/0146546 | A1* | 5/2019 | Goto | F16F 9/53 |

FOREIGN PATENT DOCUMENTS

| | | |
|---|---|---|
| GB | 2494420 A | 3/2013 |
| WO | 02089047 A1 | 11/2002 |

OTHER PUBLICATIONS

Written Opinion of the International Searching Authority issued in corresponding application No. PCT/FR2014/000202 dated Mar. 12, 2014 (6 pages).

* cited by examiner

CONTROL INTERFACE WITH HAPTIC FEEDBACK USING A MAGNETORHEOLOGICAL FLUID MODULE

The present invention relates to a control interface and especially a rotary control interface or knob, in particular for a motor vehicle, enabling haptic feedback to be transmitted to a user, such as a force of variable resistance.

Haptic feedback, on knobs for example, is comprised of resistance forces of variable values, creating hard points and levels which correspond to different commands for the devices controlled via the interface in question. Haptic feedback is advantageous while driving as it requires little attention from the driver; in particular, it does not require the driver to look away from the road.

However, a control interface with a defined haptic feedback pattern can only be suitable for a limited number of functions to control. These functions must have the same number of possible controls, equal to the number of hard points, for example, on a complete range of a grip element.

In addition, such control interfaces are generally large and difficult to couple with other controls in a compact space.

Furthermore, in order to navigate through menus and/or validate the functions selected, the knobs must often be coupled to other types of controls.

Thus, in order to control a set of functions, the control interfaces of the prior art are cumbersome and require new connections owing to the various control elements.

In order to obtain a control interface enabling the selection and validation of a plurality of controls in a reduced space and with simple mounting, the subject of the invention is a haptic feedback control interface, especially for a motor vehicle, designed to take into account an action of a user by providing the user with a haptic feedback, comprising a magnetorheological fluid module, said module comprising:
- an element which rotates about an axis (Z) of the module (5), said rotary element being in contact with the magnetorheological fluid and designed to be coupled to a grip element,
- a unit for applying a magnetic field to the magnetorheological fluid, designed to modify the strength of the magnetic field, said interface also comprises a control unit interface featuring a fixed touch-sensitive surface arranged at the center of the grip element.

Such an interface allows a rotary control to be obtained featuring a reconfigurable haptic feedback coupled to a touch-sensitive surface, all arranged in a reduced space.

According to another aspect of the present invention, the interface is configured to prevent the rotary element from rotating, via the unit for applying a magnetic field, when the touch-sensitive surface is used.

The gripping surface can also be used as a hand rest or a finger guide by the user when the touch-sensitive surface is being used.

According to a further aspect of the present invention, the unit for applying a magnetic field to the magnetorheological fluid is configured to modify the strength of the magnetic field applied according to the rotation of the rotary element about the axis (Z) of the module (5).

Such an interface allows for simple mounting and a haptic feedback with indexing.

According to an additional aspect of the present invention, the control unit also comprises display means coupled to the touch-sensitive interface.

Such an interface allows information relative to the control interface to be displayed.

According to another aspect of the present invention, the touch-sensitive surface is a capacitive surface.

According to a further aspect of the present invention, the touch-sensitive surface is a resistive surface.

According to an additional aspect of the present invention, the touch-sensitive surface is coupled to a gesture detection device.

Such an interface is used to configure commands according to predetermined gestures.

According to another aspect of the present invention, the magnetorheological fluid module has a generally cylindrical structure, one of the ends of which is closed and which comprises a fixed central axis on which the touch-sensitive surface is mounted, the rotary element being pivotally mounted around a fixed central axis and being inserted into a cavity of the module comprising the magnetorheological fluid. Furthermore, the unit applying the magnetic field comprises a coil which surrounds said cavity of the module containing the magnetorheological fluid.

According to a further aspect of the present invention, the rotary element is guided in rotation by means of bearings or ball bearings.

According to an additional aspect of the present invention, the grip element forms a rotary ring around the touch-sensitive surface.

According to another aspect of the present invention, the control unit also comprises an electronic board configured to power and control the touch-sensitive surface, said electronic board being powered via an electrical connection that passes through the central axis.

According to a further aspect of the present invention, the rotary element is coupled to a position encoder configured to supply a signal representative of the angular position of the rotary element.

Figure 2:
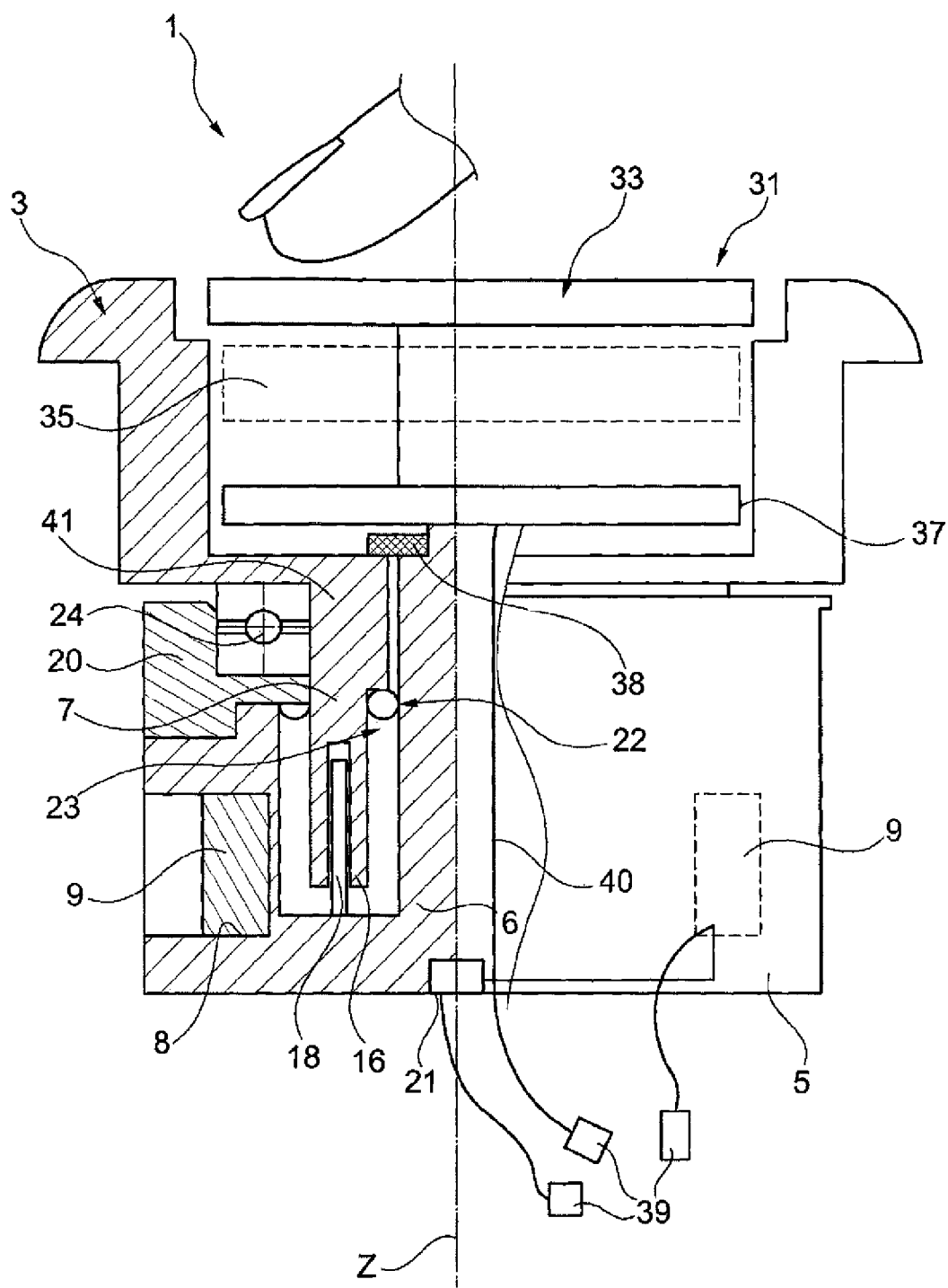

Further features and advantages of the invention will become more clearly apparent from reading the following description, given by way of example and in no way limiting, in reference to the appended drawings:

FIG. 1 shows a control interface comprising a magnetorheological fluid module featuring a touch-sensitive surface according to the present invention, FIG. 2 shows a cross-sectional view of a magnetorheological fluid module according to the present invention.

The same elements bear the same reference numbers in all the figures.

The invention relates to a control interface with haptic feedback 1, as shown in FIG. 1, for example for a dashboard of a motor vehicle, or for a central console of a motor vehicle, for controlling systems on board the vehicle. The control interface 1 comprises a magnetorheological fluid module 5 able to transmit haptic feedback to a user in the form of a resistance force applied to a grip element 3. In addition, this module 5 comprises a control unit 31 featuring a touch-sensitive surface 33.

FIG. 2 shows a cross-sectional view of a magnetorheological fluid module 5. The module 5 comprises a generally cylindrical structure closed at one of its ends which comprises a fixed central axis 6 on which is mounted the rotatable element 7 and a cavity 23 designed to receive the magnetorheological fluid on the one hand, and one extremity of the rotary element 7 on the other hand. The rotary element 7 is thus partially immersed in the magnetorheological fluid. The structure of the module 5 also includes a circular recess 8 that at least partially surrounds the cavity 23. The circular recess 8 receives one or several coils which, with its (their) power supply/supplies (not shown), form(s) a unit 9 for applying a magnetic field on the magnetorheological fluid.

The magnetic field created by a coil is proportional to the current flowing through it such that by varying the supply to the coil, one can vary the strength of the magnetic field applied to the magnetorheological fluid, which allows the viscosity of the fluid to be varied.

Furthermore, the frictional force applied by the magnetorheological fluid on the rotary element 7 varies according to the surface area of fluid in contact with the mobile element 7. Thus, the rotary element 7 may comprise a plurality of walls 16 which are opposite the walls of the cavity 23. The cavity 23 may especially comprise a central wall 18 which is arranged between the walls 16 of the rotary element 7 to increase the opposing surface area between the rotary element 7 and the fixed walls 16, 18 of the cavity 23 and thus increase the force couple that can be exerted on the rotary element 7 with a given power supply.

On the other hand, in the embodiment of FIG. 2, the cavity 23 is closed by a cover 20 that compresses a seal 22 ensuring a hermetic seal so as to prevent any leakage of magnetorheological fluid. The cover 20 also comprises a housing to accommodate a bearing or ball bearing 24 which ensures the connection with the rotary element 7 and its rotational movement.

Furthermore, in the example shown in FIG. 2, the grip element 3 is integral, i.e. rigidly connected to the rotary element 7. The rotary element 7 has an output shaft 41 which connects the module 5 to the grip element 3. The grip element 3 is, for example, integral with the rotary element 7 or clipped onto the rotary element 7 or secured by a pin or by any fastening means known in the prior art. Alternatively, the grip element 3 can be coupled to the rotary element 7 via a system of gears or any other mechanical means of ensuring a rotational coupling between the two. A system of gears especially serves to create a gear reduction between the rotation of the grip element and the rotary element 7 to allow for more precise rotation control.

Furthermore, the rotary element 7 is held in translation by a retaining element 38 such as a pin for example or any other retaining means known to those skilled in the art.

The module 5 also comprises a control unit 31 featuring a touch-sensitive surface 33 coupled to an electronic board or printed circuit 37 which are mounted on the fixed central axis 6 of the module 5. The touch-sensitive surface 33 is produced for example by a capacitive surface, a resistive surface or by optical detection of the tactile position of the user, i.e. optical gesture detection. The resistive or capacitive touch-sensitive surfaces allow a touch or approach position (capacitive) of the touch-sensitive surface 33 to be detected and are less expensive while gesture detection makes it possible to multiply the number of commands associated with predetermined gestures.

Optionally, the control unit 31 also comprises a display screen 35 positioned opposite and under the touch-sensitive surface 33. In this case, the touch-sensitive surface 33 is transparent. Preferably, the display screen 35 is positioned as close as possible to the touch-sensitive surface 33. The display screen 35 may be rectangular-shaped as shown in FIG. 1, but can also be circular and correspond with the shape of the grip element 3. In addition, a seal or a foam (not shown) can also be inserted between the edges of the touch-sensitive surface 33 and the grip element 3 so as to ensure a hermetic seal against dust or a liquid.

Thus, the touch-sensitive surface 33 and optionally the display screen 37 are powered and controlled by the electronic board 37. The electronic board 37 is powered, for example, by an electrical connection 40, by a flexible connection passing through the central axis 6, for example.

The magnetorheological fluid module 5 also comprises a sensor or position encoder 21 of the rotary element 7 that allows one to know the angular position of the rotary element 7 so as to apply a haptic feedback via the application unit 9 according to the angular position of the rotary element 7. The position encoder 21 can, for example, comprise a set of contacts and a brush, successively in contact with some of said contacts when the element 7 is rotated. Alternatively, the position encoder 21 can be an optical encoder comprising one or more optical forks or a piezoelectric device or any other position sensor known to those skilled in the art. The position encoder 21 can be arranged at different locations near the rotary element 7 and especially next to the grip element 3.

Furthermore, alternatively, the position encoder 21 can also be configured to determine the absolute angular position of the grip element 3 in relation to a reference point.

The power supply of the module 5 requires the supply of the control unit 31, the application unit 9 and the position encoder. The power supply is, for example, made by three connectors 39. Thus, when installing the module 5, one simply has to connect these three connectors 39.

The unit 9 for applying a magnetic field to the magnetorheological fluid thus is connected to the position encoder 21 and is configured to produce the desired haptic feedback according to the signal provided by the position encoder 21. This application unit 9 is configured to receive a signal from the position encoder 21 and to determine a predetermined position of the grip element 3 according to the signal received, for example a certain number of indexing positions, and to modify the strength of the magnetic field when an indexing position is reached.

Different haptic feedback shapes can be obtained depending on the configuration of the application unit 9. For example, the strength of the magnetic field can have a square shape in which the strength is zero except at the indexing positions where this strength is strong so as to create a significant friction force at the passage of indexing points. The viscosity of the magnetorheological fluid varies under the effect of a variable magnetic field such that the friction force induced by the magnetorheological fluid is low when the magnetic field is not applied and becomes increasingly stronger when the strength of the magnetic field increases. Thus, the application of a square-shaped intensity enables hard points to be created at the indexing points for which the intensity is high.

Depending on the position, other resistance force profiles or patterns are also possible, for example triangular or sawtooth profiles distributed around indexing positions, such that they are perceived as a progressive hard point to overcome, once to reach it, and once to move away, or simply to reach it.

The application unit can be reconfigured almost instantly by applying a different haptic feedback profile which allows, in particular, the position and/or the number of hard spots to be varied. Thus, the module 5 can be used for several different functions, with different indexing position numbers and different haptic feedback profiles.

Resistance forces can also be used to improve the accuracy of the displacement of the grip element 3. For example, if a precise position in a range of positions must be reached, the resistance force can be decreased or increased depending on the rotational speed of the grip element 3, for example when scrolling through a list by reducing the resistance when the rotation of the grip element 3 is rapid and by increasing the resistance when approaching the end of the list. A very strong force can also be produced by supplying the coil with a strong current to simulate a stop, for example at the start or at the end of a list. The resistance of the haptic feedback can also be adjusted by the user if he wishes a more or less pronounced haptic feedback, for example by adjusting a resistance parameter in a settings menu.

As the grip element 3 and the touch-sensitive surface 33 are mounted on the same module, interactions can be created between them. Thus, in the case where the touch-sensitive surface 33 is coupled to a display screen 35, the display can also be used when the user rotates the grip element 33. For example, the indexing points of the rotation command can be represented on the screen or the display can vary according to the position of the grip element.

Furthermore, the rotation of the grip element 3 can be blocked when the touch-sensitive surface 33 is being used. When the user is using the touch-sensitive surface 33 to apply an order, he may need to use a surface peripheral to the touch-sensitive surface 33 as a hand rest or finger guide. Such a surface may be provided by the grip element 3 when it is prevented from rotating. Rotation may be blocked by applying a sufficiently strong magnetic field to the magnetorheological fluid by means of the application unit 9. Thus, when the control unit 31 detects the user's presence at the touch-sensitive surface 31, a blocking signal is sent from the control unit 31 to the application unit 9 to prevent the rotary element 7 and consequently the grip element 3 from rotating.

Thus, the present invention allows a compact control module to be obtained comprising a rotary control with reconfigurable haptic feedback coupled with a touch-sensitive surface enabling commands or additional validations and the display of information. A single module is thus able to control a plurality of vehicle equipment while being easy to install owing to the reduced number of connections.

The invention claimed is:

1. A control interface with haptic feedback for a motor vehicle, designed to consider an action of a user by providing the user with haptic feedback, comprising a magnetorheological fluid module, said magnetorheological fluid module comprising:
   a grip element;
   a rotary element which rotates about a Z axis of the magnetorheological fluid module, said rotary element being partially immersed in magnetorheological fluid and integrally connected to the grip element; and
   an application unit for applying a magnetic field to the magnetorheological fluid, designed to modify a strength of the magnetic field,
   wherein:
   said control interface comprises a control unit featuring a fixed touch-sensitive surface arranged at a center of the grip element,
   the grip element is separate from and rotatable with respect to the fixed touch-sensitive surface,
   the rotary element comprises a plurality of walls that are opposite to a plurality of fixed walls of a cavity,
   the plurality of fixed walls of the cavity form a central wall interposed between the plurality of walls of the rotary element, and
   the central wall has a circular pattern when viewed from above so as to not overlap the Z axis of the magnetorheological fluid module.

2. The control interface according to claim 1, wherein the control interface prevents the rotary element from rotating via the application unit when the fixed touch-sensitive surface is used.

3. The control interface according to claim 1, wherein the application unit is configured to modify the strength of the magnetic field applied to according to the rotation of the rotary element about the axis of the magnetorheological fluid module.

4. The control interface according to claim 3, wherein the magnetorheological fluid module has a generally cylindrical structure, one end of which is closed and which comprises a fixed central axis on which the fixed touch-sensitive surface is mounted, the rotary element being pivotally mounted around a central axis and which is inserted into the cavity of the magnetorheological fluid module comprising the magnetorheological fluid and in which the application unit comprises a coil which surrounds said cavity of the module containing the magnetorheological fluid.

5. The control interface according to claim 4, wherein the rotary element is guided in rotation by means of bearings or ball bearings.

6. The control interface according to claim 4, wherein the grip element forms a rotary ring around the fixed touch-sensitive surface.

7. The control interface according to claim 4, wherein the control unit further comprises an electronic board that powers and controls the fixed touch-sensitive surface, said electronic board being powered via an electrical connection that passes through the central axis.

8. The control interface as claimed in claim 4, wherein all of the magnetorheological fluid contained in the cavity is disposed below the grip element.

9. The control interface according to claim 1, wherein the control unit further comprises display means coupled to the fixed touch-sensitive interface.

10. The control interface according to claim 1, wherein the fixed touch-sensitive surface is a capacitive surface.

11. The control interface according to claim 1, wherein the fixed touch-sensitive surface is a resistive surface.

12. The control interface according to claim 1, wherein the fixed touch-sensitive surface is a gesture detection device.

13. The control interface according to claim 1, wherein the rotary element is coupled to a position encoder that supplies a signal representative of an angular position of the rotary element.

14. The control interface according to claim 1, wherein the magnetorheological fluid module comprises a housing to accommodate a bearing or ball bearing which ensures a connection with the rotary element and its rotational movement.

15. The control interface according to claim 1, wherein the fixed touch-sensitive surface is transparent.

16. The control interface according to claim 15, wherein the control unit comprises a display screen positioned opposite and under the transparent fixed touch-sensitive surface.

17. The control interface according to claim 1, wherein the application unit can be reconfigured instantly by applying a different haptic feedback profile which allows positions of a plurality of hard spots to be varied.

* * * * *